Patented Sept. 29, 1953

2,653,966

UNITED STATES PATENT OFFICE 2,653,966

PURIFICATION OF ACRYLONITRILE

Keith M. Taylor and Harry M. Walker, Texas City, Tex., assignors to Monsanto Chemical Company, St. Louis, Mo., a corporation of Delaware No Drawing. Application July 20, 1951, Serial No. 237,838

7 Claims. (Cl. 260—465.9)

The present invention relates to purification of monomeric acrylonitrile and more specifically to a method of removing small proportions of hydrogen cyanide present as an impurity in crude acrylonitrile.

Crude acrylonitrile as now produced may contain minor proportions up to several per cent of hydrogen cyanide. The hydrogen cyanide present as an impurity in monomeric acrylonitrile may occur either in the form of free hydrogen cyanide or, when acetaldehyde is also present, may be combined therewith as lactonitrile. These impurities are undesirable in acrylonitrile and it is therefore necessary that they be removed. The presence of hydrogen cyanide in acrylonitrile can be determined by the phenolphthalin method described by Nicholson in The Analyst, 66, 189 (1941).

It has been found that distillation is ineffective for the removal of such minor proportions of hydrogen cyanide in free or combined form. This method is ineffective particularly when less than one per cent of hydrogen cyanide is present in the acrylonitrile.

It has now been found that hydrogen cyanide may be removed from monomeric acrylonitrile containing the same by contact with a specific proportion of an inorganic basic material selected from the group consisting of alkali and alkaline earth hydroxides, oxides, carbonates and cyanides employed in solution or dispersion. The amount of the basic material which is employed is in the range of 0.0001 to 0.3% by weight, relative to the acrylonitrile. As a result of the contacting with the basic material, the hydrogen cyanide is transformed into a partly soluble material which may precipitate or which may be absorbed upon the basic material when the latter is employed in solid form. The basic materials contemplated in the present invention include the hydroxides, oxides, carbonates and cyanides of the alkali metals, such as sodium and potassium and also the oxides, hydroxides, carbonates and cyanides of the alkaline earth metals such as calcium and magnesium.

The process is carried out by mixing of impure liquid acrylonitrile with the aqueous base such as in an extraction tower or by contacting with the solid, basic material, preferably in the form of small particles. Subsequent distillation, filtration, decantation or centrifugation may be employed to remove the alkaline material together with the absorbed impurities to leave the acrylonitrile substantially free of hydrogen cyanide. The basic material may be employed in an anhydrous condition, as a solid containing water of hydration, or as an aqueous solution. The purification may also be conducted in the presence of a non-reactive solvent for the acrylonitrile, such as a hydrocarbon, for example, kerosene in which the alkaline material may be slurried or dispersed for use in the purification step.

The temperature employed is not critical, since the purification may be carried out at room temperature, or at higher temperatures such as at the boiling point of acrylonitrile.

The invention will be illustrated in greater detail by the following examples:

Example 1

Monomeric acrylonitrile prepared by the reaction of hydrogen cyanide with acetylene was subjected to a preliminary distillation to obtain a crude material containing 700 parts per million of HCN as determined by the phenolphthalin method. This HCN may be present either as free hydrogen cyanide or if acetaldehyde is also present may be present as lactonitrile. The acrylonitrile was contacted with about 0.125% by weight (relative to the acrylonitrile) of solid sodium hydroxide in the form of pellets. The pellets were agitated in the acrylonitrile which was then filtered off leaving the unreacted sodium hydroxide plus a small quantity of a fine precipitate. It was observed that the residual material also tended to be adhered upon the base. This treatment reduced the hydrogen cyanide content to about one part per million (0.0001%) of HCN.

Example 2

Acrylonitrile monomer in crude form containing 700 parts per million of hydrogen cyanide was agitated with an equal volume of a 0.125% solution of sodium hydroxide in water. The mixture was kept at a temperature of 25° C. during the agitation step. The water layer was then withdrawn, after which the remaining material was distilled to obtain pure acrylonitrile. The purified material was found to contain less than 0.0005% of hydrogen cyanide.

Example 3

Three-hundred grams of technical grade acrylonitrile produced by the reaction of acetylene and hydrogen cyanide and containing 1000 parts per million of hydrogen cyanide were mixed with 0.3% of aqueous sodium cyanide (2.5% solution). The mixture was boiled in a distilling column operated at total reflux for five minutes, after which the solution was cooled and a trace of fine precipitate was filtered off. The filtrate was then distilled through a distilling column to yield pure acrylonitrile in 97.8% yield. The product obtained had an HCN content of less than 0.0005%.

*Example 4*

A sample of technical grade of acrylonitrile containing 881 parts per million of hydrogen cyanide was shaken with 0.5% of 10% sodium hydroxide aqueous solution. The mixture was allowed to stand at room temperature for 17 hours and was then assayed for the HCN content using the phenolphthalin method. It was found that the HCN content was 1.7 parts per million.

In general it has been found that the amount of basic material which is present must be maintained within the critical concentrations of 0.0001% to 0.5% by weight relative to the acrylonitrile. It is not clearly understood how the treatment operates, although it would appear that there is no direct neutralization of the hydrogen cyanide by the basic material since the proportions of the latter are far less than the stoichiometric amount.

*Example 5*

A purification was carried out similarly to that of Example 1 but employing 0.01% of sodium carbonate dissolved in water. This aqueous solution was contacted with acrylonitrile containing about 700 parts per million of HCN. After agitation the aqueous phase was removed. The remaining acrylonitrile was found to have the hydrogen cyanide content reduced to less than 0.0005% of hydrogen cyanide.

*Example 6*

A purification treatment with crude acrylonitrile containing about 700 parts per million of hydrogen cyanide was carried out by contacting the acrylonitrile with a kerosene dispersion containing calcium hydroxide. The proportion of the calcium hydroxide corresponded to 0.001% by weight based upon the crude acrylonitrile. After the acrylonitrile and the kerosene had been mixed and then separated, the hydrogen cyanide content of acrylonitrile was less than 0.0005%.

*Example 7*

A purification treatment similar to that of Example 1 was carried out by the use of a dispersion of magnesium carbonate in benzene. The benzene slurry was contacted with about twice its volume of acrylonitrile so that the magnesium carbonate present corresponded to about 0.01% by weight relative to the acrylonitrile. After the materials had been contacted the acrylonitrile was removed and was found to have the hydrogen cyanide content reduced to less than 0.005%.

The proportion of base which is employed in the treating process is a critical variable, as set forth above. However, when the basic material is employed in aqueous solution, the amount of water may be varied widely, ranging from small proportions in which the base is merely slurried to larger proportions which may also accomplish other purposes such as water-washing of the crude acrylonitrile.

What is claimed is:

1. The method of purifying monomeric acrylonitrile to remove hydrogen cyanide therefrom which comprises contacting the said acrylonitrile with from 0.0001% to 0.3% by weight of a basic compound selected from the group consisting of alkali and alkaline earth hydroxides, oxides, carbonates and cyanides, and thereafter separating the purified acrylonitrile.

2. The method of purifying monomeric acrylonitrile to remove hydrogen cyanide therefrom which comprises contacting the said acrylonitrile with from 0.0001% to 0.3% by weight of sodium hydroxide, and thereafter separating the purified acrylonitrile.

3. The method of purifying monomeric acrylonitrile to remove hydrogen cyanide therefrom which comprises contacting the said acrylonitrile with from 0.0001% to 0.3% by weight of calcium hydroxide, and thereafter separating the purified acrylonitrile.

4. The method of purifying monomeric acrylonitrile to remove hydrogen cyanide therefrom which comprises contacting the said acrylonitrile with from 0.0001% to 0.3% by weight of magnesium hydroxide, and thereafter separating the purified acrylonitrile.

5. The method of purifying monomeric acrylonitrile to remove hydrogen cyanide therefrom which comprises contacting the said acrylonitrile with from 0.0001% to 0.3% by weight of sodium carbonate, and thereafter separating the purified acrylonitrile.

6. The method of purifying monomeric acrylonitrile to remove hydrogen cyanide therefrom which comprises contacting the said acrylonitrile with from 0.0001% to 0.3% by weight of sodium cyanide, and thereafter separating the purified acrylonitrile.

7. The method of claim 1 carried out with a basic compound dissolved in water.

KEITH M. TAYLOR.
HARRY M. WALKER.

References Cited in the file of this patent

UNITED STATES PATENTS

| Number | Name | Date |
|---|---|---|
| 2,351,157 | Semon | June 13, 1944 |
| 2,385,549 | Spence | Sept. 25, 1945 |
| 2,471,928 | Bortnick et al. | May 31, 1949 |
| 2,527,660 | Spillane | Oct. 31, 1950 |